United States Patent
Matsushima

(10) Patent No.: US 8,625,968 B2
(45) Date of Patent: Jan. 7, 2014

(54) RECORDING APPARATUS AND CONTROL METHOD THEREOF

(75) Inventor: Shuichiro Matsushima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/013,425

(22) Filed: Jan. 25, 2011

(65) Prior Publication Data

US 2011/0188834 A1    Aug. 4, 2011

(30) Foreign Application Priority Data

Feb. 3, 2010    (JP) .................................. 2010-022524

(51) Int. Cl.
*H04N 5/94*    (2006.01)
*H04N 9/88*    (2006.01)
*H04N 9/80*    (2006.01)

(52) U.S. Cl.
USPC ............................ 386/263; 386/239; 386/248

(58) Field of Classification Search
USPC .................................. 386/239–248, 263–277
See application file for complete search history.

(56) References Cited

U.S. PATENT DOCUMENTS

| | | | |
|---|---|---|---|
| 6,031,758 A | 2/2000 | Katayama et al. | |
| 7,283,729 B2 * | 10/2007 | Chung et al. | 386/318 |
| 7,979,636 B2 | 7/2011 | Ito | |
| 2003/0041253 A1 * | 2/2003 | Matsui et al. | 713/189 |
| 2003/0191980 A1 * | 10/2003 | Gotoh et al. | 714/7 |
| 2005/0259163 A1 * | 11/2005 | Tsujii et al. | 348/231.2 |
| 2007/0222896 A1 | 9/2007 | Oikawa | |
| 2008/0046649 A1 | 2/2008 | Ito | |
| 2009/0180209 A1 | 7/2009 | Maeda et al. | |
| 2009/0313444 A1 | 12/2009 | Nakamura | |
| 2010/0115185 A1 | 5/2010 | Ono et al. | |
| 2011/0264842 A1 | 10/2011 | Nakanishi et al. | |

FOREIGN PATENT DOCUMENTS

| | | |
|---|---|---|
| JP | 09-223363 A | 8/1997 |
| JP | 2002-109895 | 4/2002 |
| JP | 2008-046923 | 2/2008 |
| JP | 2008-097148 A | 4/2008 |
| JP | 2008-097169 A | 4/2008 |
| WO | 2008/018446 A1 | 2/2008 |
| WO | 2009/001519 A1 | 12/2008 |

OTHER PUBLICATIONS

Naru Hamada, U.S. Appl. No. 12/977,663, filed Dec. 23, 2010.
Naru Hamada, U.S. Appl. No. 13/014,349, filed Jan. 26, 2011.
Naru Hamada, U.S. Appl. No. 13/013,474, filed Jan. 25, 2011.
May 3, 2012 U.S Office Action, that issued in related U.S. Appl. No. 12/977,663.

(Continued)

*Primary Examiner* — Hung Dang
(74) *Attorney, Agent, or Firm* — Cowan, Liebowitz & Latman, P.C.

(57) ABSTRACT

A recording apparatus is disclosed that records information data and file system information for managing a file containing the information data in accordance with a predetermined file system to a recording medium having a plurality of blocks including an alternative block for a detect block. The data recorded in the recording medium is managed in accordance with the predetermined file system. The recording apparatus sets a threshold based on the size of the file system information, and if the alternative block remaining amount in the recording medium is less than or equal to the threshold, recording of the information data to the recording medium is inhibited.

10 Claims, 10 Drawing Sheets

(56) References Cited

OTHER PUBLICATIONS

Jun. 12, 2013 U.S Office Action, that issued in related U.S. Appl. No. 12/977,663.

Aug. 28, 2013 U.S. Office Action, that issued in related U.S. Appl. No. 13/014,349.

Sep. 24, 2013 Japanese Office Action, that issued in Japanese Patent Application No. 2010-022522, which is a counterpart application of the related U.S. Appl. No. 13/013,474.

* cited by examiner

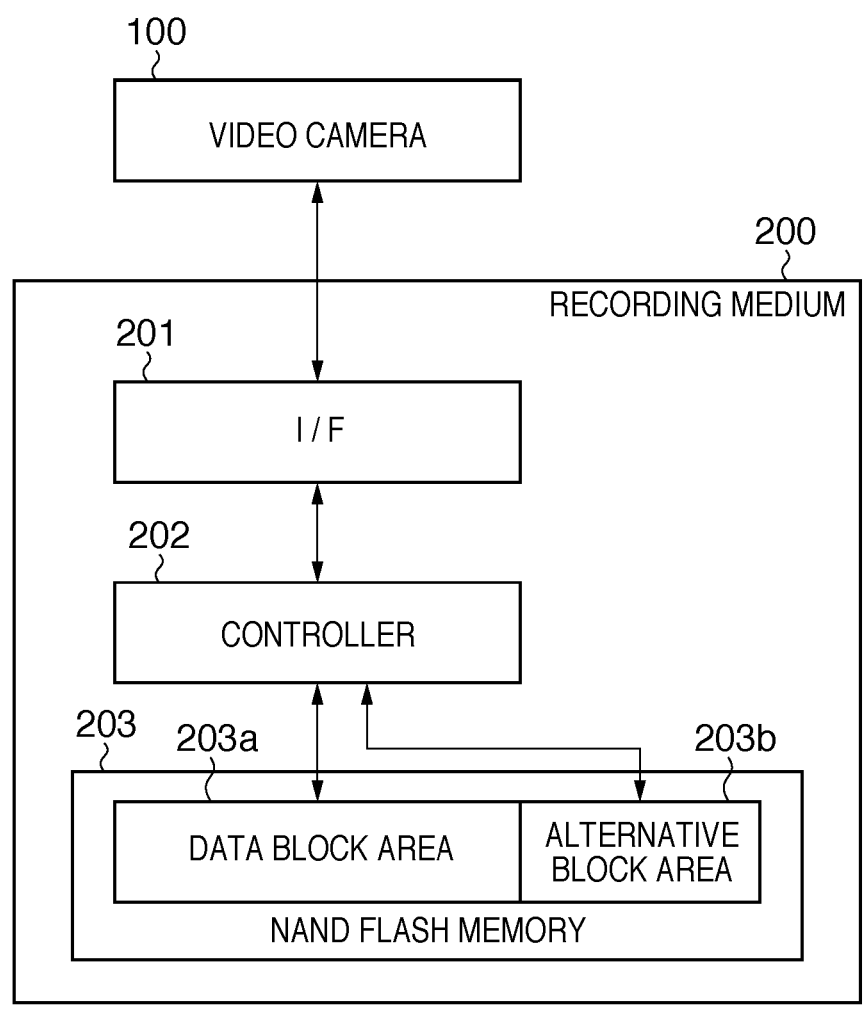

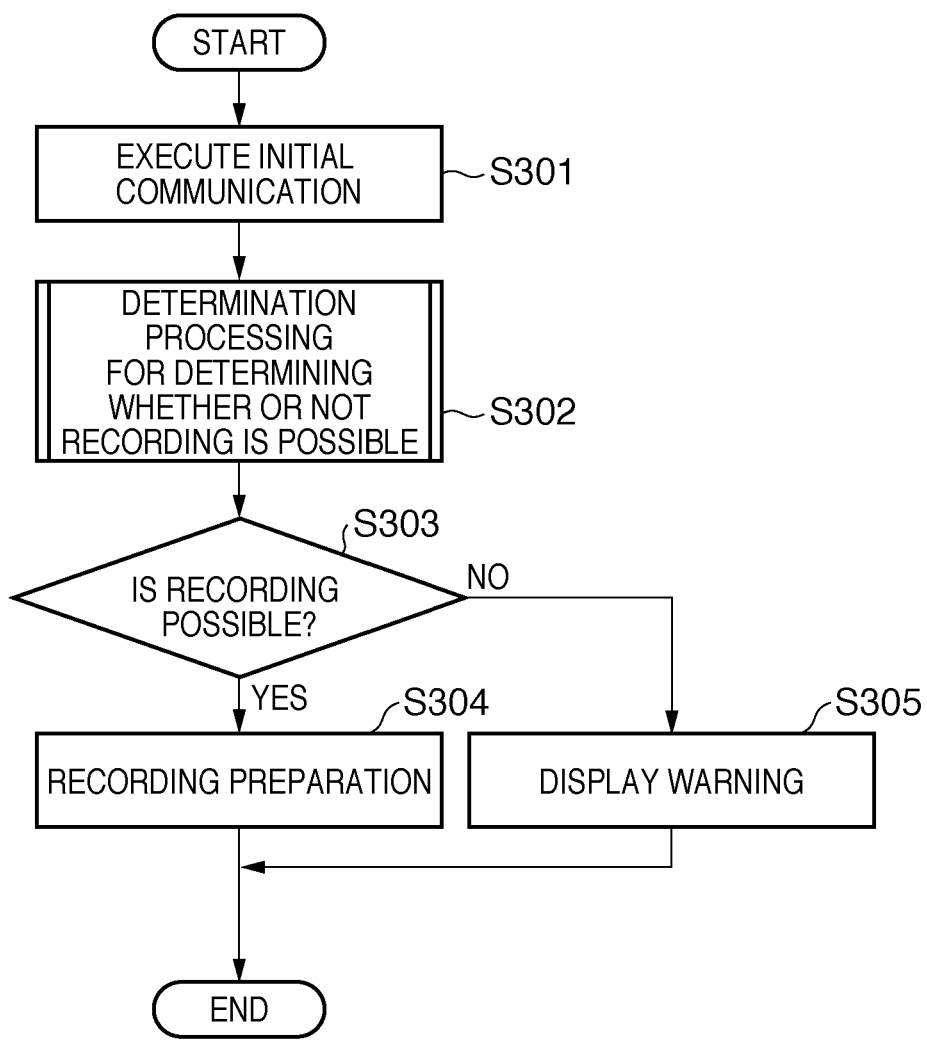

RECORDING APPARATUS AND CONTROL METHOD THEREOF

BACKGROUND OF THE INVENTION

1. Field of the Invention

The present invention relates to a recording apparatus utilizing a flash memory and a control method of the recording apparatus.

2. Description of the Related Art

Conventionally, video cameras that record moving images and audio to recording media are known. More recently, video cameras that record moving images and audio to a large capacity flash memory or a memory card incorporating a flash memory have appeared.

A flash memory writes and reads out data in units called blocks. There are cases, however, in which a defect block in which data cannot be written normally may occur during the manufacturing process or due to a later cause. To address this, a part of the memory is prepared for use as alternative blocks for such a defect block, and data that is supposed to be recorded to the defect block is written to an alternative block (see, for example, Japanese Patent Laid-Open No. 2002-109895).

However, even when a part of the flash memory is prepared for use as alternative blocks, if a defect block occurs after the alternative blocks have been used up, normal data writing is not possible, causing a writing error. In particular, when such a situation occurs during the writing of file system information to close a file, the file cannot be closed, and there is a possibility that not only this file but also all files recorded in the memory up to that point not be able to be read out.

When data is recorded to a flash memory, the recorded data is generally managed in accordance with a predetermined file system such as FAT (File Allocation Table). Accordingly, if the alternative blocks are used up during recording of moving images with a video camera, when a defect block is found during recording of file system information for managing the recorded file, rewriting of the file system information is not possible. Furthermore, if the alternative blocks are used up during update of the file system, the file system information might be corrupted, and data that has already been recorded might not be able to be read out.

SUMMARY OF THE INVENTION

The present invention has been made in view of the above-described problems, and an embodiment of the present invention provides a recording apparatus that can more reliably perform normal update of file system information in a recording medium having alternative blocks, and a control method of the recording apparatus.

According to one aspect of the present invention, there is provided a recording apparatus comprising: a recording unit configured to record information data and file system information for managing a file containing the information data in accordance with a predetermined file system to a recording medium having a plurality of blocks including an alternative block for a defect block; a managing unit configured to manage the information data recorded in the recording medium in accordance with the predetermined file system; a setting unit configured to set a threshold based on a data size of the file system information; and a control unit configured to control the recording unit so as to inhibit recording of the information data to the recording medium if an alternative block remaining amount in the recording medium is less than or equal to the threshold.

Also, according to another aspect of the present invention, there is provided a control method of a recording apparatus including a recording unit configured to record information data and file system information for managing a file containing the information data in accordance with a predetermined file system to a recording medium having a plurality of blocks including an alternative block for a defect block, the method comprising the steps of: managing the information data recorded in the recording medium in accordance with the predetermined file system; setting a threshold based on a size of the file system information; and controlling the recording unit so as to inhibit recording of the information data to the recording medium if an alternative block remaining amount in the recording medium is less than or equal to the threshold.

Further features of the present invention will become apparent from the following description of exemplary embodiments with reference to the attached drawings.

BRIEF DESCRIPTION OF THE DRAWINGS

FIG. 2 is a diagram showing a configuration of a recording medium according to an embodiment of the present invention.

FIG. 3 is a flowchart illustrating recording medium mounting processing.

DESCRIPTION OF THE EMBODIMENTS

Hereinafter, preferred embodiments of the present invention will be described with reference to the accompanying drawings.

Figure 1A:
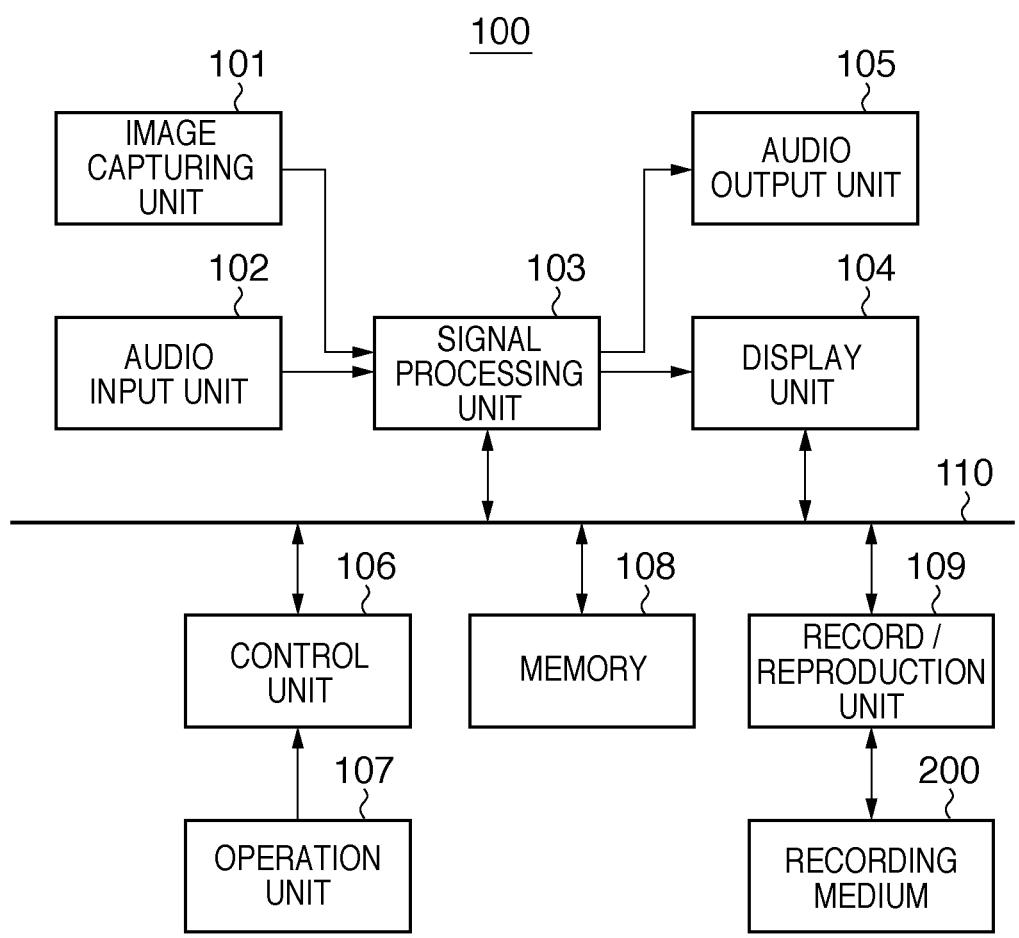
FIG. 1A is a diagram showing a configuration of a video camera according to a first embodiment of the present invention.

FIG. 1A is a block diagram showing a configuration of a video camera 100 according to a first embodiment of the present invention. In FIG. 1A, an image capturing unit 101 captures images of an object and outputs moving image data to a signal processing unit 103. An audio input unit 102 has a microphone, and outputs audio data to the signal processing unit 103. When recording, the signal processing unit 103 performs necessary processing, such as compression, encoding and the like according to a predetermined encoding method such as MPEG, on the moving image data from the image capturing unit 101 and the audio data from the audio input unit 102. When reproducing, the signal processing unit 103 decodes reproduced moving image data and audio data. A display unit 104 displays captured moving images from the signal processing unit 103 when recording. When reproducing, the display unit 104 displays reproduced moving images. The display unit 104 also displays information necessary for user operations such as a menu. An audio output unit 105 has a speaker, and outputs an audio signal from the signal processing unit 103.

A control unit 106 has a microcomputer, a memory and the like, and controls various constituent units of the video camera 100. An operation unit 107 has a power switch, a switch for issuing instructions to start and stop recording, a switch for switching to a reproduction mode, a menu switch, and the like. The user can designate a function of the video camera 100 through operation of any of the switches of the operation unit 107. A memory 108 has an SDRAM or the like, and stores compressed moving image data, audio data, and other necessary data. The memory 108 also functions as a buffer memory when recording or reproducing data to or from a recording medium 200. A record/reproduction unit 109 writes or reads out data to or from the recording medium 200 in accordance with an instruction from the control unit 106. The recording medium 200 is a random access recording medium, and is a memory card incorporating a NAND flash memory in the present embodiment. The recording medium 200 can be easily attached to and detached from the video camera 100 by the user with an attachment/detachment mechanism (not shown). A system bus 110 transmits data and various commands between the blocks.

In the present embodiment, the control unit 106 manages information data, such as moving images and audio, recorded in the recording medium 200 as a file in accordance with a predetermined file system such as FAT file system. Accordingly, in addition to the information file in which information data is stored, file system information for managing the recorded file is recorded to the recording medium 200. The file system information recorded in the recording medium 200 is updated along with information file recording processing. The record/reproduction unit 109 may have a configuration corresponding to a general-purpose interface such as ATA (Advanced Technology Attachment). In this case, the control unit 106 controls writing and readout of data to and from the recording medium 200 by outputting a command defined by the general-purpose interface to the record/reproduction unit 109.

Next, the recording medium 200 will be described. FIG. 2 is a block diagram showing a configuration of the recording medium 200. As shown in FIG. 2, the recording medium 200 has an interface (I/F) 201 that transmits and receives data and commands to and from a recording apparatus such as the video camera 100, a controller 202, and a NAND flash memory 203. The recording medium 200 is capable of writing data into the flash memory 203 in blocks, each consisting of a plurality of bytes, and is configured such that a part of all blocks is utilized as alternative blocks for defect blocks in which data cannot be written normally. In other words, the flash memory 203 has, as a storage unit, a data block area 203a and an alternative block area 203b for defect blocks in the data block area. In the present embodiment, a predetermined physical address area in the flash memory 203 has been allocated in advance as the alternative block area 203b.

In FIG. 2, the interface (I/F) 201 transmits and receives commands and data to and from the record/reproduction unit 109 of the video camera 100. The controller 202 controls writing or readout of data to or from the flash memory 203 in response to a command received by the I/F 201. For example, upon receiving a write request command from the record/reproduction unit 109, the controller 202 receives data to be written from the record/reproduction unit 109 and writes the data to the data block area 203a. If the writing processing has completed normally, the controller 202 generates a writing result as a response, and transmits the response to the record/reproduction unit 109 via the recording I/F 201.

If the writing of data to the data block area 203a does not complete within a predetermined period of time, the controller 202 determines that a defect block has occurred, and writes the data to an unused block in the alternative block area 203b instead of the defect block. The controller 202 then changes an address map of the flash memory 203 so as to replace the address of the defect block with the address of the alternative block. Furthermore, the controller 202 generates a response indicating a writing error, and transmits the response to the record/reproduction unit 109 via the I/F 201. Upon occurrence of a defect block(s), the controller 202 writes information regarding the position and the number of defect blocks that have occurred, and so on, to a system management area in the data block area 203a. In other words, the controller 202 allocates an address (physical address) in the flash memory 203 to an address (logical address) designated by an external device, and generates an address map indicating correspondences between logical addresses and physical addresses. Then, when a defect block occurs, the controller 202 changes the address map so as to allocate the physical address of an alternative block to the designated logical address. The controller 202 saves the address map in the data block area 203a.

If the alternative block area 203b for defect blocks has been used up, the controller 202 writes information indicating that the recording medium is a reproduction-only (read-only) recording medium to the system management area in the data block area 203a. By doing so, the controller 202 can transmit a response indicating that the recording medium is for reproduction only when a query for the operational state of the recording medium 200 is received from a host device such as the video camera 100.

As will be described later, the controller 202 receives a threshold for comparison with available remaining amount of the alternative block area from the video camera 100, and holds the threshold in an internal register. Then, the controller 202 compares the alternative block remaining amount recorded in the system management area with the threshold, and if the alternative block remaining amount is less than or equal to the threshold, the controller 202 notifies the record/reproduction unit 109 of information indicating that the alternative block remaining amount is insufficient via the I/F 201. Also, the controller 202 compares the alternative block remaining amount and the threshold each time writing to an alternative block is performed during writing of data, and determines whether the alternative block remaining amount is larger than the threshold. The controller 202 then outputs a notification indicating whether the alternative block remaining amount is insufficient in response to a query from the video camera 100 as to whether the remaining amount is insufficient.

Next, a description of recording preparation (mounting) processing for the recording medium 200 performed when the recording medium 200 is attached and when the power of the video camera 100 is turned on will be given. FIG. 3 is a flowchart illustrating the mounting processing. The processing shown in FIG. 3 is executed by the control unit 106 controlling various units.

When the power of the video camera 100 is turned on, the record/reproduction unit 109 determines whether the recording medium 200 is attached, and if the recording medium 200 is attached, the record/reproduction unit 109 so notifies the control unit 106. Alternatively, the record/reproduction unit 109 detects that the recording medium 200 has been newly attached while the power of the video camera 100 is on, and so notifies the control unit 106. The processing shown in FIG. 3 starts when the record/reproduction unit 109 notifies that the recording medium 200 is attached upon power-on of the video camera 100 or when the record/reproduction unit 109 detects that the recording medium 200 has been newly attached as described above.

Firstly, the control unit 106 executes initial communication (S301). In the initial communication, the control unit 106 resets the controller 202 of the recording medium 200, and receives register information of the recording medium 200 necessary to record data from the recording medium 200. Next, the control unit 106 executes determination processing for determining whether recording of data to the recording medium 200 is possible in accordance with the obtained information (S302). The determination processing will be described later in detail. If it is determined that recording is possible (S303), the control unit 106 executes recording preparation processing (S304). More specifically, the control unit 106 reads out file system information from the recording medium 200, stores the file system information in the memory 108, analyzes the content of the file system information, and obtains information necessary for recording such as the remaining recording capacity of the recording medium 200. Also, the control unit 106 checks the files recorded in the recording medium 200, and searches for a file that can be managed by the video camera 100. If, on the other hand, it is determined that the recording in S303 is to be inhibited, the control unit 106 displays warning information indicating that data recording is not possible to the recording medium 200 on the display unit 104, and terminates the mounting processing without performing recording preparation processing.

Figure 4:
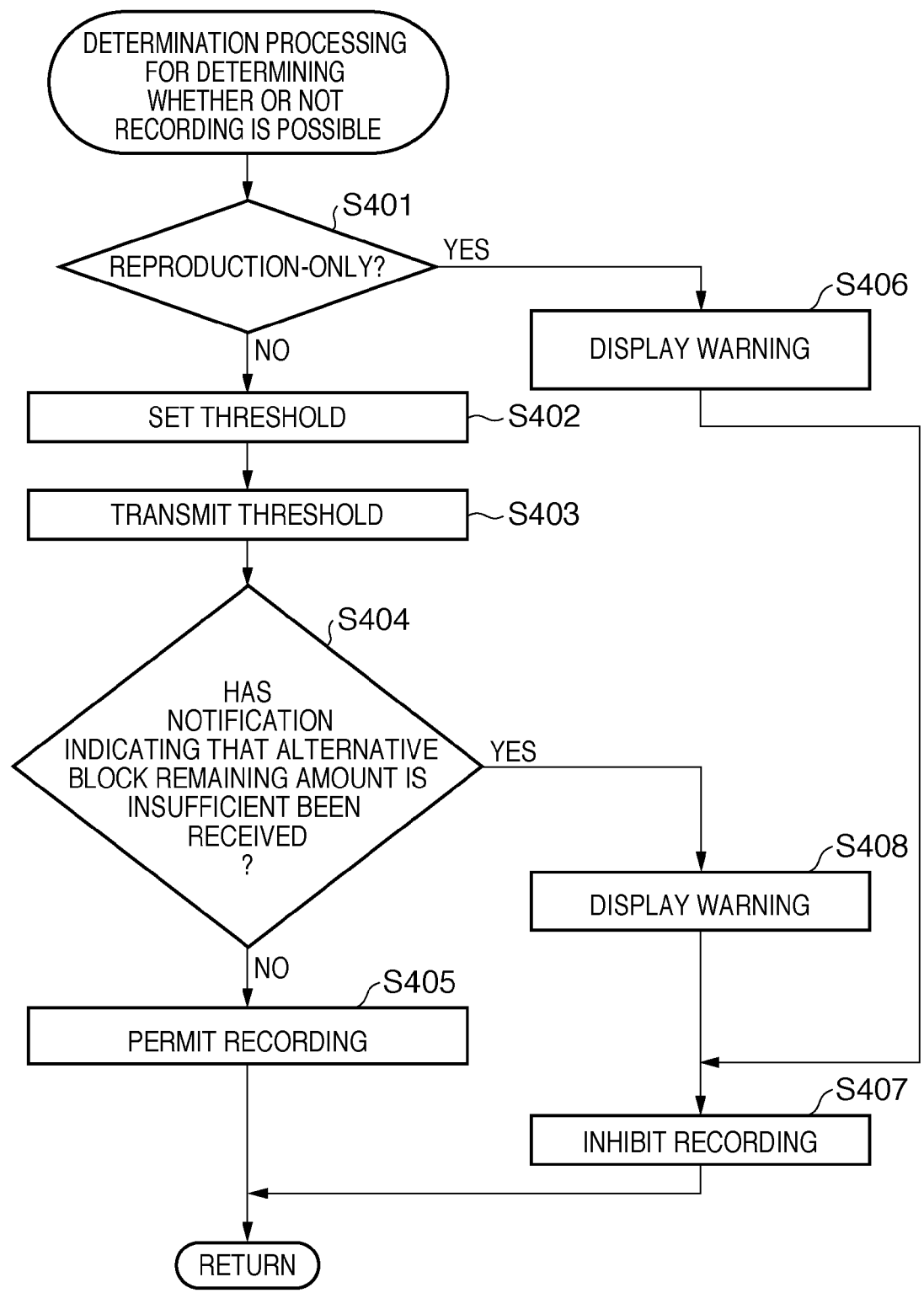
FIG. 4 is a flowchart illustrating determination processing for determining whether or not recording is possible.

Next, the determination processing (S302) for determining whether or not recording is possible that is performed in the processing for mounting the recording medium 200 (FIG. 3) will be described. FIG. 4 is a flowchart illustrating the determination processing for determining whether or not recording is possible. In FIG. 4, firstly, the control unit 106 queries the recording medium 200 for the state of the recording medium 200, and determines whether the recording medium 200 is a reproduction-only recording medium based on a response from the controller 202 of the recording medium 200 (S401). If it is determined that the recording medium 200 is a reproduction-only recording medium, the control unit 106 displays warning information indicating the fact on the display unit 104 (S406), and inhibits data recording (S407).

If, on the other hand, it is determined in S401 that the recording medium 200 is not a reproduction-only recording medium, the control unit 106 sets a threshold for comparison with the remaining amount of alternative blocks (the amount of unused alternative blocks) in the alternative block area 203b of the recording medium 200 (S402). The processing for setting the threshold will be described later. Then, the control unit 106 transmits a query as to whether the alternative block remaining amount is insufficient to the controller 202 of the recording medium 200 together with information regarding the set threshold (S403). When the threshold is transmitted from the video camera 100, the controller 202 holds the threshold information in the internal register as described above. Then, the controller 202 detects the alternative block remaining amount in the alternative block area 203b, and compares the alternative block remaining amount with the transmitted threshold. If the result of comparison indicates that the alternative block remaining amount is smaller than the threshold, the controller 202 transmits information indicating that the alternative block remaining amount is insufficient to the record/reproduction unit 109. The record/reproduction unit 109 receives the information indicating that the alternative block remaining amount is insufficient, and transmits the information to the control unit 106.

If the control unit 106 receives a notification indicating that the alternative block remaining amount is not insufficient (S404), it permits data recording to the recording medium 200 (S405). If the control unit 106 receives a notification indicating that the alternative block remaining amount is insufficient (S404), it displays warning information indicating that recording is not possible to the recording medium 200 on the display unit 104 (S408), and inhibits recording to the recording medium 200 (S407).

Figure 5:
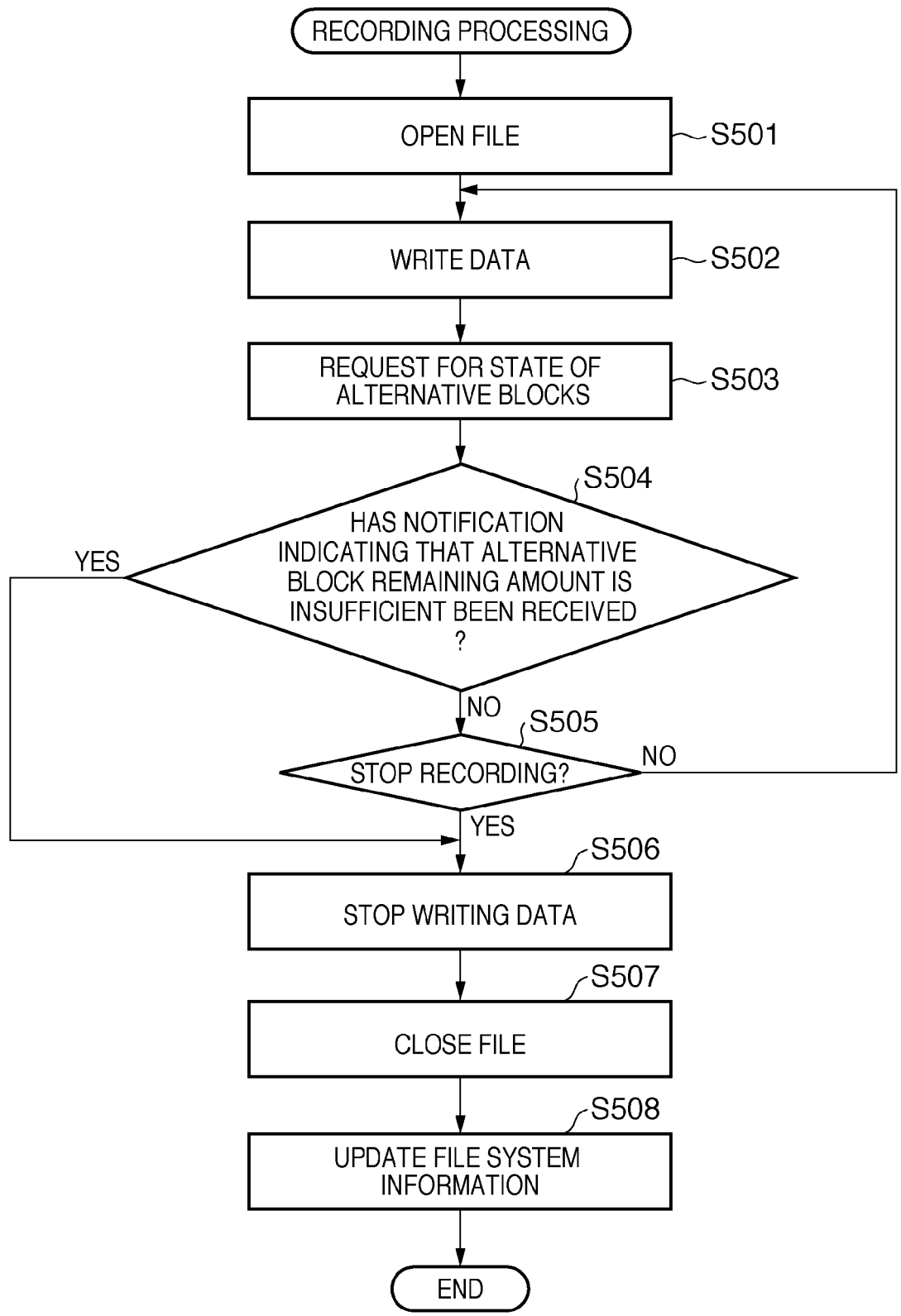
FIG. 5 is a flowchart illustrating recording processing.

Next, recording processing will be described. FIG. 5 is a flowchart illustrating recording processing of the video camera 100. The processing shown in FIG. 5 is executed by the control unit 106 controlling various units. The processing shown in FIG. 5 starts when the user issues an instruction to start recording through operation of the operation unit 107. Firstly, the control unit 106 performs file open processing for opening a moving image file for storing captured moving image data and input audio data (S501). In this processing, the control unit 106 determines the file name, and registers the file information thereof in the file system information stored in the memory 108.

Also, the control unit 106 controls the signal processing unit 103 so as to compress the moving image data from the image capturing unit 101 and the audio data from the audio input unit 102, and stores the compressed moving image data and audio data in the memory 108. Then, when a predetermined amount of moving image data and audio data corresponding to a writing unit is stored in the memory 108, the control unit 106 reads out the data from the memory 108, and writes the data into the recording medium 200 (S502). In the present embodiment, the rate at which data can be written into the recording medium 200 is higher than the rate of the moving image data and audio data output from the signal processing unit 103. Accordingly, writing of data to the recording medium 200 is performed intermittently. The memory 108 functions as a buffer memory for such intermittent recording. More specifically, when the amount of moving image data and audio data corresponding to a preset writing unit have been stored in the memory 108, the control unit 106 starts data writing to the recording medium 200. After that, when writing of data per writing unit is complete, the control unit 106 stops data writing to the recording medium 200. In this manner, by repeating the writing of data per writing unit, data is intermittently written.

When a single recording unit of data has been written in the manner described above, the control unit 106 queries the recording medium 200 for the state of alternative block remaining amount (S503). The controller 202 of the recording medium 200 compares the alternative block remaining amount and the threshold, and notifies the result of comparison in the manner described above. The control unit 106 determines whether or not it has received a notification indicating that the alternative block remaining amount is insufficient in response to the query (S504). If the control unit 106 receives a notification indicating that the alternative block remaining amount is insufficient, it stops writing data without waiting for a user's instruction to stop recording (S506), and closes the currently recorded file (S507). Then, the control unit 106 changes the content of the file system information stored in the memory 108 along with the stopping of recording, writes the file system information into the recording medium 200, and thereby updates the file system information (S508).

If, on the other hand, the control unit 106 receives a notification indicating that the alternative block remaining amount is larger than the threshold in S504, it continues writing, and waits for an instruction to stop recording from the user. If the user issues an instruction to stop recording through operation of the operation unit 107 (S505), the control unit 106 soon stops storing new moving image data and audio data in the memory 108, writes the stored data into the recording medium 200, and thereafter stops writing (S506). Then, the control unit 106 closes the currently recorded file (S507), changes the content of the file system information stored in the memory 108, and writes the file system information into the recording medium 200, thereby updating the file system information (S508).

Next, the threshold set in S402 of FIG. 4 will be described. In the present embodiment, the threshold is set such that when updating the file system information recorded in the recording medium 200, even if the blocks designated to record the file system information are all defect blocks, the file system information can be updated by recording the file system information in alternative blocks.

The amount of data needed to update the file system information when closing a file is, in the case of FAT32, the sum of a block capacity needed to write a file entry and a block capacity needed to update the FAT. For example, where the size needed to update the FAT and file entry is assumed to be 4 mega bytes (MB), if the alternative block remaining amount is 4 MB or more when closing the file, the file system information can be updated normally. Here, if the size of one block in the recording medium 200 is assumed to be 2 MB, the number of alternative blocks needed to update the file system information will be two. It should be noted that the size of one block of 2 MB is merely exemplary, and the present invention is not limited thereto.

Furthermore, in the present embodiment, the threshold may be set based on the amount of data per writing unit. For example, in S503 of FIG. 5, a query for the state of alternative blocks is made after completion of writing of data per writing unit, and if the alternative block remaining amount is low, recording is stopped. Accordingly, the total of the amount of the single writing unit of data and the size needed to update the file system information is set as the threshold. By doing so, even if the blocks designated as a place into which one writing unit of data to be written next is to be written are all defect blocks, the single writing unit of data to be written next is all recorded in alternative blocks.

For example, if one writing unit is assumed to be N bytes, writing data into the recording medium 200 starts each time N-byte data is stored in the memory 108. And, the sum of N bytes and the size needed to update the file system information is set as the threshold. For example, if the amount of data needed to update the file system information is assumed to be M bytes, the threshold is set to N+M bytes. In this manner, in the present embodiment, in S402, N+M bytes is set as the threshold, and the threshold is transmitted to the controller 202 of the recording medium 200.

If the size of one writing unit is reduced, the threshold can be set to a smaller value. The smaller the threshold, the more alternative block capacity will be used by the time recording is stopped, enabling more efficient use of the recording medium. This, however, increases the frequency of issuance of write instructions from the control unit 106 to the record/reproduction unit 109. On the other hand, if the size of one writing unit is increased, the frequency of issuance of write instructions from the control unit 106 to the record/reproduction unit 109 can be decreased, enabling efficient use of the bandwidth of the system bus 110.

It is also possible to set the threshold independently of the writing unit. For example, a configuration can be employed in which the controller 202 of the recording medium 200 regularly compares the alternative block remaining amount and the threshold, and if the alternative block remaining amount is smaller than the threshold, the record/reproduction unit 109 is so notified even while data is being written. With this configuration, it is possible to detect insufficiency of the alternative block remaining amount and immediately stop writing of data to the recording medium 200 even while one writing unit of data is being written. In this case, the data size needed to update the file system information can be set as the threshold.

In the present embodiment, in FIG. 5, a query for the state of alternative blocks is made to the recording medium 200 each time writing of one writing unit of data is complete, but the present invention is not limited thereto. It is possible to, for example, make a query before writing of one writing unit of data starts. Also, if there is information, other than the file system information, that needs to be updated along with recording of moving image data such as management information for managing the order of reproduction of recorded data, the threshold may be set based on the size of the management information. The threshold is set so as to secure an alternative block remaining amount that is more than or equal to the data size needed to update at least file system information, and the data size of the file system information may be used as the threshold.

Next, reproduction processing will be described. Upon receiving an instruction for a reproduction mode from the operation unit 107, the control unit 106 controls the record/reproduction unit 109 so as to read out each moving image file recorded in the recording medium 200 and output the moving image file to the signal processing unit 103. The signal processing unit 103 decodes the first image of each moving image file, generates a representative image for each moving image file by using the first image, and displays a list of representative images on the display unit 104.

When the user selects a desired representative image from the list of representative images, and issues an instruction to start reproduction, the control unit 106 instructs the record/reproduction unit 109 so as to reproduce the moving image file corresponding to the selected representative image. The record/reproduction unit 109 reproduces the selected moving image file from the recording medium 200, and outputs the moving image file to the signal processing unit 103. The signal processing unit 103 decodes the moving image data and audio data of the reproduced moving image file, and outputs the moving image data and audio data to the display unit 104 and the audio output unit 105, respectively. The control unit 106 stops reproduction of the moving image file when it receives an instruction to stop reproduction.

In the manner described above, according to the first embodiment, the threshold is set based on the amount of data needed to update the file system information and the amount of data per writing unit, and if the alternative block remaining amount in the recording medium 200 reaches the threshold value, recording is stopped. Accordingly, the file system information can be updated more reliably, and the recorded data can be normally recorded and reproduced.

A second embodiment will be described next. The first embodiment has described the configuration in which information regarding the set threshold is transmitted to the controller 202 of the recording medium 200, and the controller 202 transmits the result of comparison between the alternative block remaining amount and the threshold to the video camera 100. The second embodiment will describe a configuration in which a video camera 100 receives information regarding the alternative block remaining amount from a recording medium 200, compares the received alternative block remaining amount with a threshold, and determines whether the recording is stopped based on the comparison result. The video camera 100 according to the second embodiment has the same configuration as that of the first embodiment (FIG. 1A). Also, the recording medium 200 according to the second embodiment basically have the same configuration as that of the first embodiment (FIG. 2). However, a controller 202 according to the second embodiment is configured so as to detect an alternative block remaining amount when it has received a request to transmit the alternative block remaining amount from the video camera 100 and transmit information indicating the remaining amount to the video camera 100.

Figure 6:
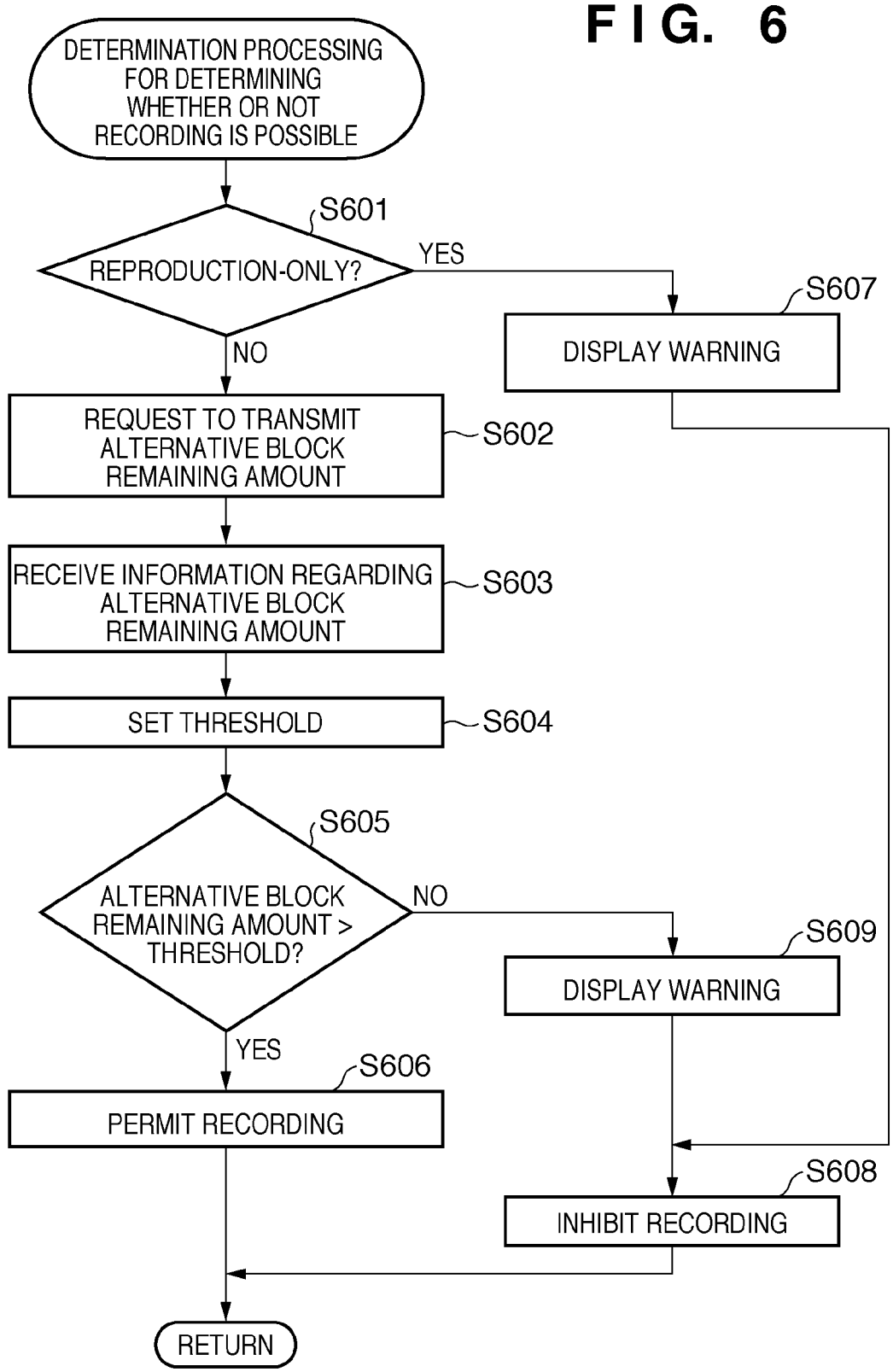
FIG. 6 is a flowchart illustrating determination processing for determining whether or not recording is possible.

FIG. 6 is a flowchart illustrating determination processing for determining whether or not recording is possible (S302 of FIG. 3) according to the second embodiment. In FIG. 6, firstly, the control unit 106 queries the recording medium 200 for the state of the recording medium 200. Then, the control unit 106 determines whether the recording medium 200 is a reproduction-only recording medium based on a response from the controller 202 of the recording medium 200 (S601). If it is determined that the recording medium 200 is a reproduction-only recording medium, the control unit 106 displays warning information indicating the fact on the display unit 104 (S607), and inhibits data recording (S608).

If, on the other hand, it is determined in S601 that the recording medium 200 is not a reproduction-only recording medium, the control unit 106 requests the recording medium 200 to transmit information regarding the alternative block remaining amount (S602). Upon receiving the request for the information regarding the alternative block remaining amount from the video camera 100, the controller 202 detects the alternative block remaining amount in the alternative block area 203b, and transmits information indicating the remaining amount to the record/reproduction unit 109. The record/reproduction unit 109 receives the information indicating the alternative block remaining amount, and transmits the information to the control unit 106 (S603).

Upon receiving the information regarding the alternative block remaining amount, the control unit 106 sets a threshold for comparison with the alternative block remaining amount of the recording medium 200 (S604). Then, the control unit 106 compares the received alternative block remaining amount with the threshold, and determines whether the alternative block remaining amount is larger than the threshold (S605). If it is determined as a result that the alternative block remaining amount is larger than the threshold, the control unit 106 permits data recording to the recording medium 200 (S606). If it is determined that the alternative block remaining amount is not larger than the threshold, (less than or equal to the threshold), the control unit 106 displays warning information indicating that data recording is not possible to the recording medium 200 (S609), and inhibits data recording to the recording medium 200 (S608). The method of setting the threshold is the same as that of the first embodiment.

Figure 7:
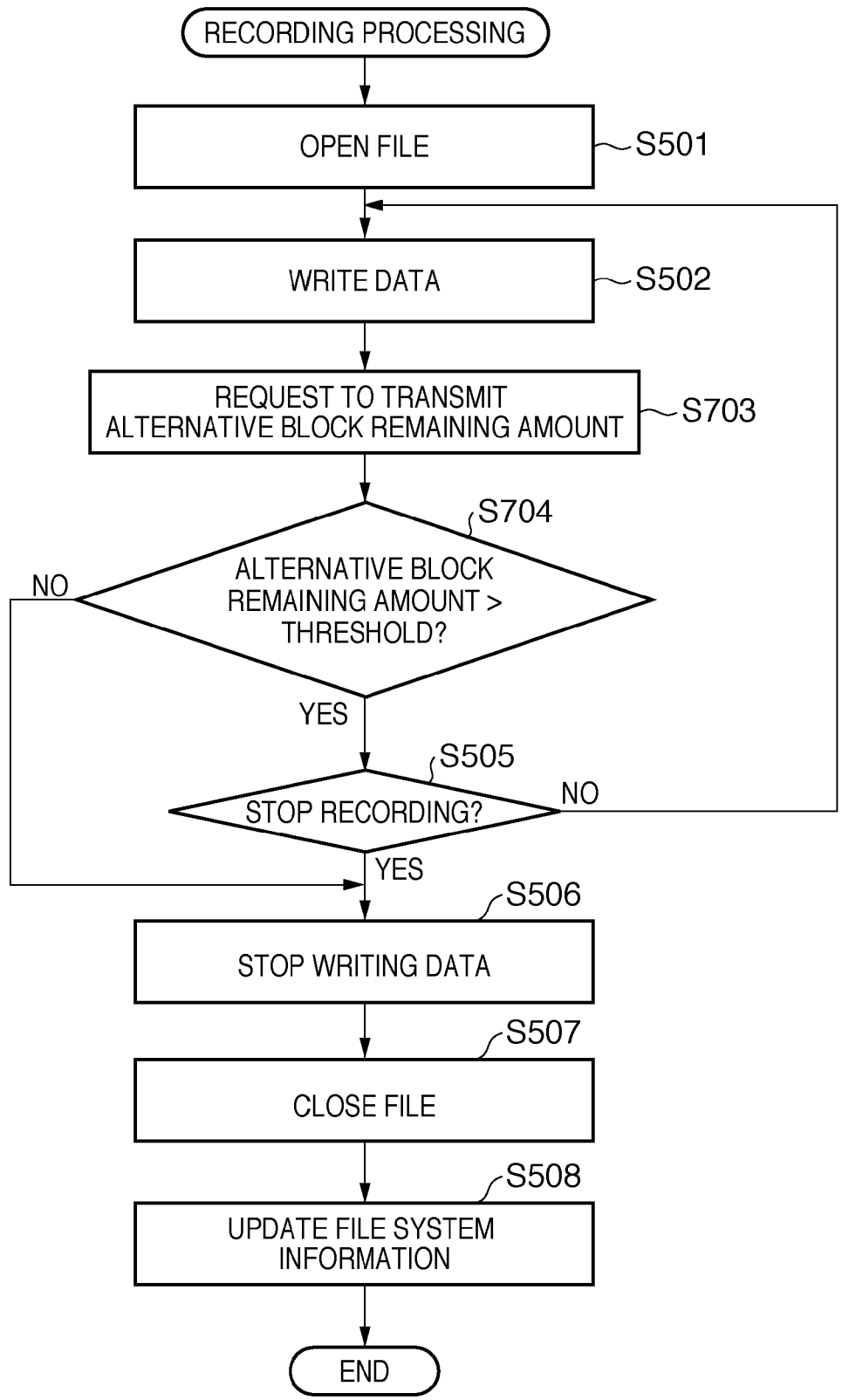
FIG. 7 is a flowchart illustrating recording processing.

Next, recording processing according to the second embodiment will be described. FIG. 7 is a flowchart illustrating recording processing according to the second embodiment. In FIG. 7, the processing blocks that are the same as those of FIG. 5 are given the same reference numerals, and a detailed description thereof is omitted here.

When an instruction to start recording has been received, and one writing unit of moving image and audio data has been stored in the memory 108, the control unit 106 controls the record/reproduction unit 109 so as to request the recording medium 200 to transmit information indicating the alternative block remaining amount (S703). Then, the control unit 106 compares the alternative block remaining amount received from the recording medium 200 in response to this request with the threshold set in S604, and determines whether the alternative block remaining amount is larger than the threshold (S704). If it is determined as a result that the alternative block remaining amount is larger than the threshold, the control unit 106 decides to continue recording, and executes the processing in S505 and the subsequent steps. If, on the other hand, it is determined that the alternative block remaining amount is not larger than the threshold (less than or equal to the threshold), the control unit 106 stops writing data to the recording medium 200 (S506).

With the second embodiment described above, the same effects as those of the first embodiment can be obtained.

Figure 1B:
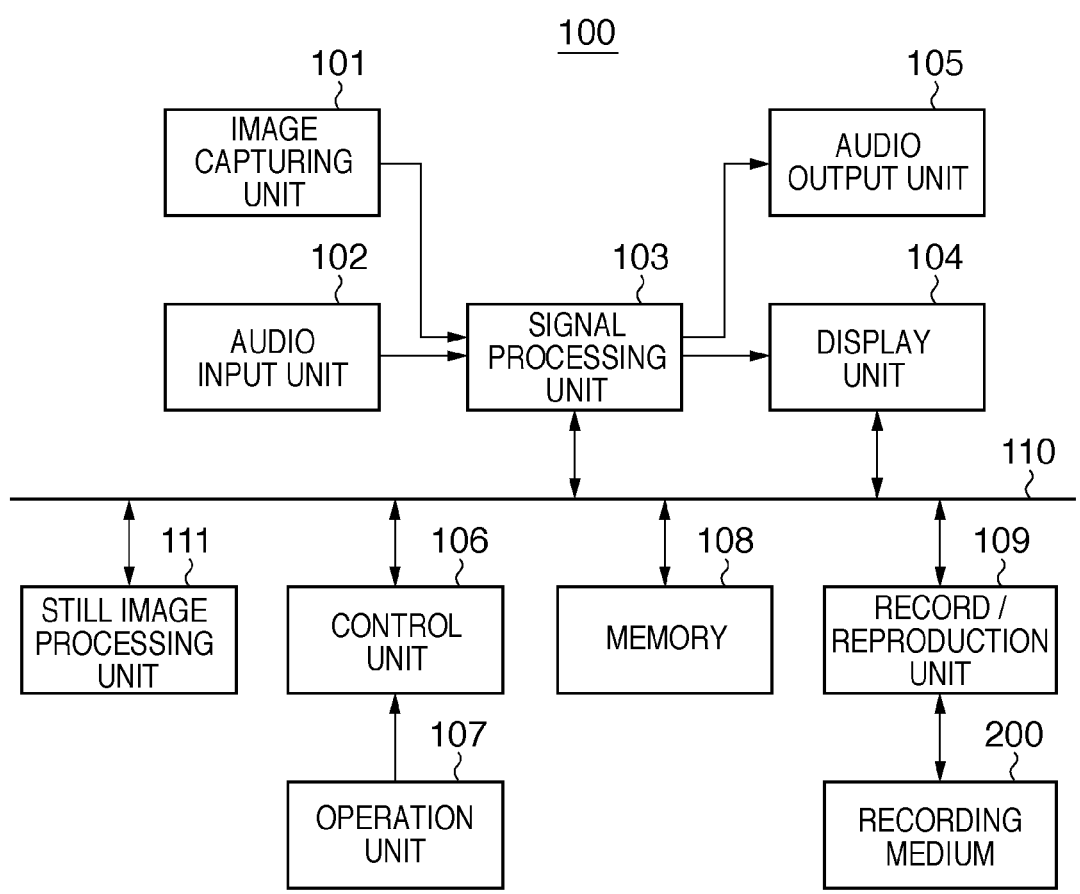
FIG. 1B is a diagram showing a configuration of a video camera according to a third embodiment of the present invention.

Next, a third embodiment will be described. FIG. 1B is a diagram showing a configuration of a video camera according to the third embodiment. A video camera 100 according to the third embodiment has, in addition to the function of recording and reproducing moving images, a function of recording and reproducing still images, and thus, includes a still image processing unit 111 in addition to the configuration described in the first embodiment (FIG. 1A). Hereinafter, portions of the configuration different from those of the first and second embodiments will be mainly described.

In FIG. 1B, the operation unit 107 is equipped with a mode switch for switching between a moving image recording mode and a still image recording mode. The still image processing unit 111 performs known compression/encoding processing according to JPEG or the like on still image data stored in the memory 108 in response to an instruction to record a still image.

In the present embodiment, as a threshold for comparison with the alternative block remaining amount in the recording medium 200, different values are set for the moving image mode and the still image mode. In the present embodiment as well, the mounting processing shown in FIG. 3 is executed when the power of the video camera has been turned on and when the recording medium 200 has been newly attached. The threshold set by the control unit 106 in S402 of FIG. 4 is a threshold for the moving image mode. In the moving image recording mode, insufficiency of the alternative block remaining amount is detected as described in FIG. 5 by using the threshold for the moving image mode.

If, on the other hand, the video camera 100 is switched from the moving image recording mode to the still image recording mode, the control unit 106 sets a threshold for the still image mode and determines whether the alternative block remaining amount is insufficient. Next, determination processing for determining whether or not recording is possible that is performed along with the mode switching will be described with reference to the flowchart shown in FIG. 8. The processing shown in FIG. 8 starts when an instruction to switch between the moving image recording mode and the still image recording mode is issued through the operation unit 107 while the video camera 100 is not recording.

Figure 8:
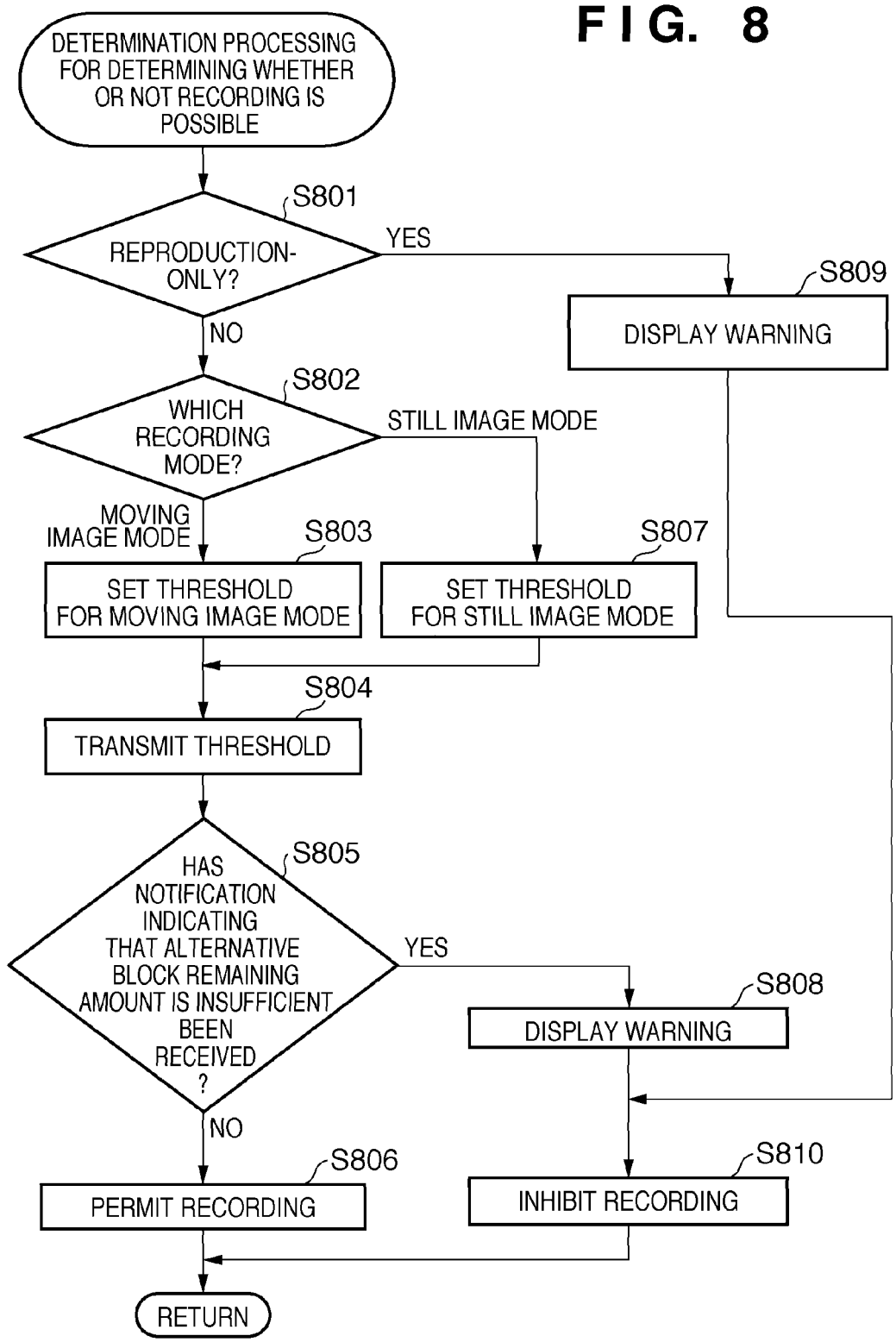
FIG. 8 is a flowchart illustrating determination processing for determining whether or not recording is possible.

In FIG. 8, the control unit 106 first queries the recording medium 200 for the state of the recording medium 200. Then, the control unit 106 determines whether the recording medium 200 is a reproduction-only recording medium based on a response from the controller 202 of the recording medium 200 (S801). If it is determined that the recording medium 200 is a reproduction-only recording medium, the control unit 106 displays warning information indicating the fact on the display unit 104 (S809), and inhibits data recording (S810).

If, on the other hand, it is determined in S801 that the recording medium 200 is not a reproduction-only recording medium, the control unit 106 determines which of the moving image mode and the still image mode the video camera 100 is in after the mode has been switched (S802). If it is determined that the video camera 100 is in the moving image mode, the control unit 106 sets a threshold for the moving image mode that is used to compare with the alternative block remaining amount in the alternative block area 203b of the recording medium 200 (S803). The threshold for the moving image mode is the same as the thresholds of the first and second embodiments. If, on the other hand, it is determined that the video camera 100 is in the still image mode, the control unit 106 sets a threshold for the still image mode (S807). In the present embodiment, the sum of the size needed to update the file system information and the amount of one screen's worth of still image data, or a value that is larger than the sum is set as the threshold for the still image mode. The present embodiment has a configuration in which the user can set the number of pixels and the compression rate of still images that are recorded. Accordingly, the amount of one screen's worth of still image data is set based on the number of pixels and the compression rate of still images that are set by the user.

After the threshold corresponding to each mode has been set in the manner described above, the control unit 106 transmits a query as to whether the alternative block remaining amount is insufficient to the controller 202 of the recording medium 200 together with information regarding the set threshold (S804). When the threshold is transmitted from the video camera 100, the controller 202 detects the alternative block remaining amount in the alternative block area 203b and compares the alternative block remaining amount with the received threshold. If the result of comparison indicates that the remaining amount of the alternative block area 203b is smaller than the threshold, the controller 202 transmits information indicating that the alternative block remaining amount is insufficient to the record/reproduction unit 109. The record/reproduction unit 109 receives the information indicating that the alternative block remaining amount is insufficient, and transmits the information to the control unit 106.

If the control unit 106 receives a notification indicating that the alternative block remaining amount is not insufficient (S805), it permits data recording to the recording medium 200 (S806). If the control unit 106 receives a notification indicating that the alternative block remaining amount is insufficient (S805), it inhibits data recording to the recording medium 200 (S805).

Figure 9:
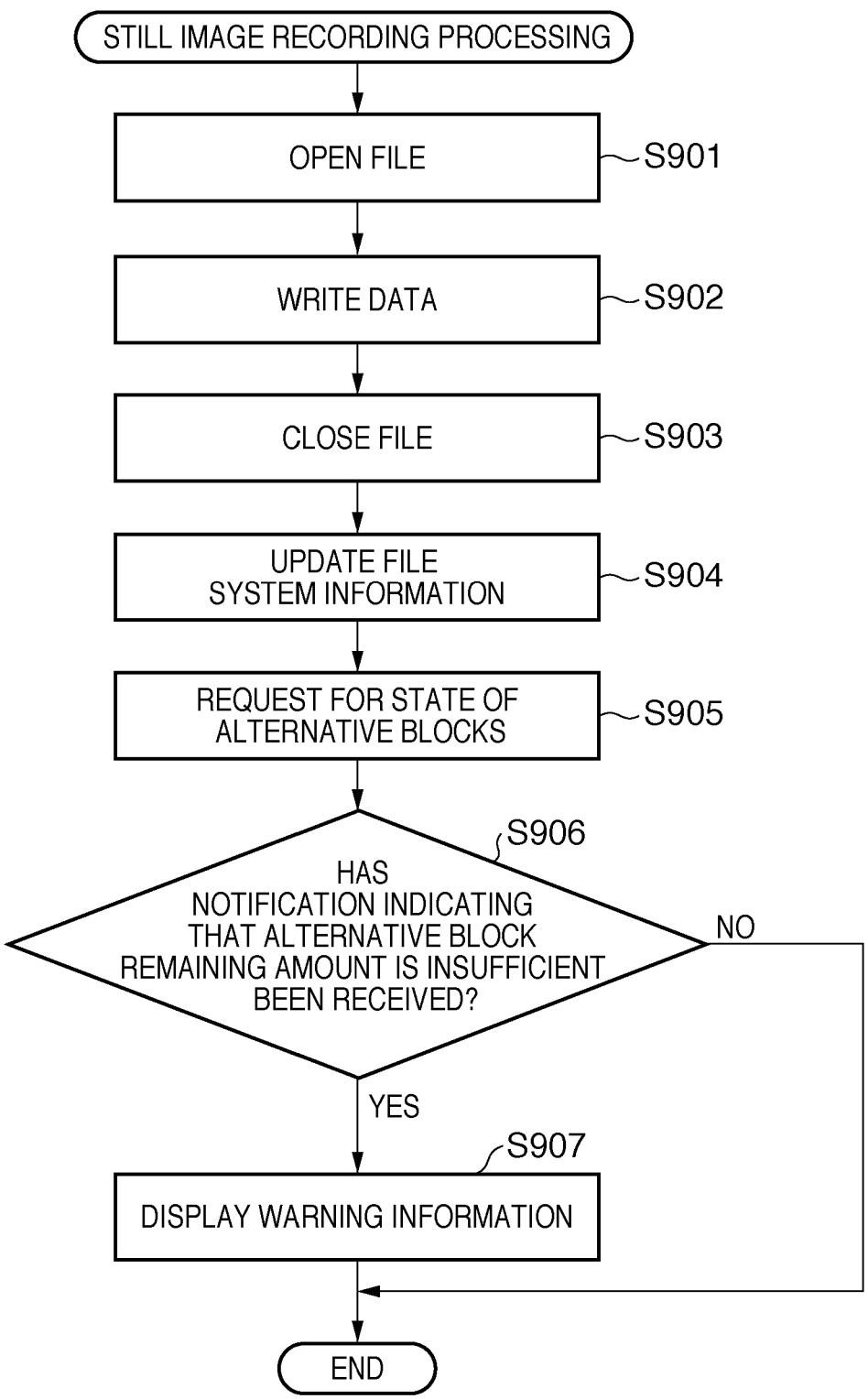
FIG. 9 is a flowchart illustrating still image recording processing.

Next, still image recording processing according to the present embodiment will be described. FIG. 9 is a flowchart illustrating still image recording processing. The processing shown in FIG. 9 is executed by the control unit 106 controlling various units. When the power is turned on through the operation unit 107, moving images captured by the image capturing unit 101 are displayed on the display unit 104. In this state, when the user issues an instruction to switch the mode to a still image mode, and then issues an instruction to record a still image, the control unit 106 instructs the image capturing unit 101 to output one picture of image data corresponding to the time when the instruction to record a still image was issued as still image data. The image capturing unit 101 outputs the one picture of still image data, and stores the data in the memory 108 in response to the instruction from the control unit 106. Then, the control unit 106 controls the still image processing unit 111 so as to compress the one picture of still image data, and again stores the data in the memory 108.

When the still image data compressed in the manner described above is stored in the memory 108, the control unit 106 performs file open processing for opening a still image file (S901). In this processing, the control unit 106 determines the file name, and registers the file information thereof in the file system information stored in the memory 108. Then, the control unit 106 reads out the still image data and additional data such as file header from the memory 108, and writes the data into the recording medium 200 (S902). Upon completion of writing of the one picture of still image data, the control unit 106 closes the currently recorded still image file (S903). Then, the control unit 106 changes the content of the file system information stored in the memory 108, and writes the file system information into the recording medium 200, thereby updating the file system information (S904).

Upon completion of the writing of one picture of still image data in the manner described above, the control unit 106 queries the recording medium 200 for the state of alternative block remaining amount (S904). The controller 202 of the recording medium 200 compares the alternative block remaining amount in the alternative block area 203b with the threshold, and notifies the result of comparison. The control unit 106 determines whether or not it has received a notification indicating that the alternative block remaining amount is insufficient in response to the query (S906). If the control unit 106 receives a notification indicating that the alternative block remaining amount is insufficient, it displays warning information indicating that writing of data is not possible due to insufficient alternative blocks on the display unit 104 (S907). If, on the other hand, the control unit 106 receives a notification indicating that the alternative block remaining amount is larger than the threshold, it terminates the processing.

As described above, according to the third embodiment, a value that is different from that for the moving image recording mode is set as the threshold for the still image recording mode, enabling more efficient use of the recording medium 200.

In the third embodiment, the threshold is changed between the moving image recording mode and the still image recording mode, but besides this configuration, it is also possible to employ a configuration in which, for example, the threshold is changed according to the type (content) of data to be recorded.

Also, the third embodiment may have the same configuration as in the second embodiment in which the video camera 100 receives information regarding the alternative block remaining amount from the recording medium 200, and the control unit 106 compares the alternative block remaining amount with the threshold and determines whether recording is possible.

The third embodiment has described the configuration in which the threshold is changed between the moving image recording mode and the still image recording mode, but if there are recording modes other than these modes, the threshold may be set according to each mode. For example, the video camera 100 of FIG. 1B may have a function (mode) of creating and recording a file containing print control data for use when printing captured still image data with a printer, such as a Digital Print Order Format (DPOF) file.

In this case, when the user issues an instruction to create a DPOF file through operation of the operation unit 107, the control unit 106 creates a DPOF file for printing a designated still image file, and records the file in the recording medium 200 by using the record/reproduction unit 109. At this time, the control unit 106 sets the size of the DPOF file+the size needed to update the file system information as the threshold, and determines whether the alternative block remaining amount is larger than the threshold. Then, the control unit 106 permits recording of the DPOF file if the alternative block remaining amount is larger than the threshold, and inhibits recording of the DPOF file if the alternative block remaining amount is less than or equal to the threshold.

The video cameras 100 according to the first to third embodiments (FIGS. 1A and 1B) may have a function of creating a play list file (PLF) that designates the order of reproduction of recorded moving images and recording the file in the recording medium 200. In this case, when the user designates the order of reproduction of moving image files recorded in the recording medium 200 and issues an instruction to create a PLF through operation of the operation unit 107, the control unit 106 creates a PLF for reproducing the moving image files in the designated order. Then, the control unit 106 records the PLF in the recording medium 200 by using the record/reproduction unit 109.

At this time, the control unit 106 sets, as the threshold, the size of the PLF+the size needed to update the file system information, and determines whether the alternative block remaining amount is larger than the threshold. Then, the control unit 106 permits creation and recording of the PLF if the alternative block remaining amount is larger than the threshold, and inhibits recording of the PLF if the alternative block remaining amount is less than or equal to the threshold.

In each of the embodiments described above, the recording medium 200 has a configuration capable of being attached to and detached from the video camera 100. Besides this configuration, it is also possible to employ a configuration in which a recording medium containing a flash memory is incorporated in the video camera body, and the present invention is also applicable to such a configuration.

As described above, according to the present invention, it is possible to provide a recording apparatus that can more reliably perform normal update of file system information in a recording medium having alternative blocks, and a control method of the recording apparatus.

The present invention may be embodied in the form of, for example, a system, an apparatus, a method, a program, a storage medium, and the like, and, specifically, the present invention may be applied to a system comprising a plurality of devices or an apparatus comprising a single device.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-022524, filed on Feb. 3, 2010, which is hereby incorporated by reference herein in its entirety.

What is claimed is:

1. A recording apparatus comprising:
   a recording unit configured to record image data in a recording medium having a plurality of blocks including an alternative block for a defect block;
   a managing unit configured to manage an image file containing the image data recorded in the recording medium in accordance with FAT file system,
   wherein the recording unit records in the recording medium a file system information, which includes a file entry of the image file and a file allocation table, for managing the image file recorded in the recording medium and the managing unit updates the file entry of the image file and the file allocation table recorded in the recording medium in accordance with recording of the image data;
   a setting unit configured to set a value corresponding to a data amount needed to update the file entry of the image file and the file allocation table recorded in the recording medium as a threshold; and
   a control unit configured to control the recording unit, in accordance with a remaining amount of the alternative block in the recording medium and the threshold set by the setting unit, so as to inhibit recording of the image data in the recording medium if a remaining amount of the alternative block in the recording medium is less than or equal to the threshold.

2. The apparatus according to claim 1, wherein the setting unit sets a value larger than the data size of the file system information as the threshold.

3. The apparatus according to claim 1, comprising:
   a unit configured to input image data to be recorded in the recording medium; and
   a memory configured to store the input image data,
   wherein the recording unit reads out a predetermined amount of image data from the memory and records the read image data in the recording medium in response to the predetermined amount of image data being stored in the memory, and
   the setting unit sets a sum of a data amount needed to update the file entry of the image file and the file allocation table and the predetermined amount as the threshold.

4. The apparatus according to claim 1, wherein the image data includes moving image data or still image data, and
   the setting unit sets the threshold to a different value between a moving image recording mode for recording the moving image data and a still image recording mode for recording the still image.

5. The apparatus according to claim 1, wherein the control unit controls the recording unit so as to stop recording of the image data in accordance with the remaining amount of the alternative block reaching the threshold during recording of the image data, and thereafter controls the managing unit so as to update the file entry of the image data which the recording unit stops recording and the file allocation table recorded in the recording medium.

6. The apparatus according to claim 1, wherein the recording medium includes a storage unit configured to have the plurality of blocks and a controller configured to control writing and readout of data to and from the storage unit, and the control unit controls the recording unit so as to output information regarding the threshold to the controller so that a notification is made if the remaining amount of the alternative block reaches the threshold, and stop recording of image data in accordance with the notification from the recording medium.

7. The apparatus according to claim 1, wherein the control unit controls the recording unit so as to request the recording medium for a notification regarding the remaining amount of the alternative block, thereby obtaining the remaining amount of the alternative block from the recording medium, and stop recording of the image data in accordance with the obtained remaining amount of the alternative block reaching the threshold.

8. A control method of a recording apparatus including a recording unit configured to record image data in a recording medium having a plurality of blocks including an alternative block for a defect block, the method comprising the steps of:

managing an image file containing the image data recorded in the recording medium in accordance with FAT predetermined file system;

recording by the recording unit in the recording medium a file system information, which includes a file entry of the image file and a file allocation table, for managing the image file recorded in the recording medium, wherein the step of managing updates the file entry of the image file and the file allocation table recorded in the recording medium in accordance with recording of the image data;

setting a value corresponding to a data amount needed to update the file entry of the image file and the file allocation table recorded in the recording medium as a threshold; and controlling the recording unit, in accordance with a remaining amount of the alternative block in the recording medium and the threshold set by the setting unit, so as to inhibit recording of the image data in the recording medium if a remaining amount of the alternative block in the recording medium is less than or equal to the threshold.

9. A recording apparatus comprising:

a recording unit configured to record still image data and file system information for managing a file containing the still image data in accordance with a predetermined file system in a recording medium having a plurality of blocks including an alternative block for a defect block;

a generation unit configured to generate print control data for the still image data recorded in the recording medium, wherein the recording unit records the print control data in the recording medium as a file;

a managing unit configured to manage the still image data recorded in the recording medium using the file system information recorded in the recording medium in accordance with the predetermined file system;

a setting unit configured to set a sum of a data size needed to update the file system information and a data size of the print control data as a threshold; and a control unit configured to control the recording unit so as to inhibit recording of the still image data in the recording medium if a remaining amount of the alternative block in the recording medium is less than or equal to the threshold.

10. A recording apparatus comprising:

a recording unit configured to record moving image data and file system information for managing a file containing the moving image data in accordance with a predetermined file system in a recording medium having a plurality of blocks including an alternative block for a defect block;

a generation unit configured to generate a play list indicating a reproducing order of the moving image data recorded in the recording medium, wherein the recording unit records the play list in the recording medium;

a managing unit configured to manage the moving image data recorded in the recording medium using the file system information recorded in the recording medium in accordance with the predetermined file system;

a setting unit configured to set a sum of a data size needed to update the file system information and a data size of the play list as a threshold; and a control unit configured to control the recording unit so as to inhibit recording of the moving image data in the recording medium if a remaining amount of the alternative block in the recording medium is less than or equal to the threshold.

* * * * *